June 20, 1950     M. S. MUMFORD     2,512,284
PORTABLE UNIT FOR HEATING MILK BOTTLES AND THE LIKE
Filed Oct. 30, 1946     2 Sheets-Sheet 1
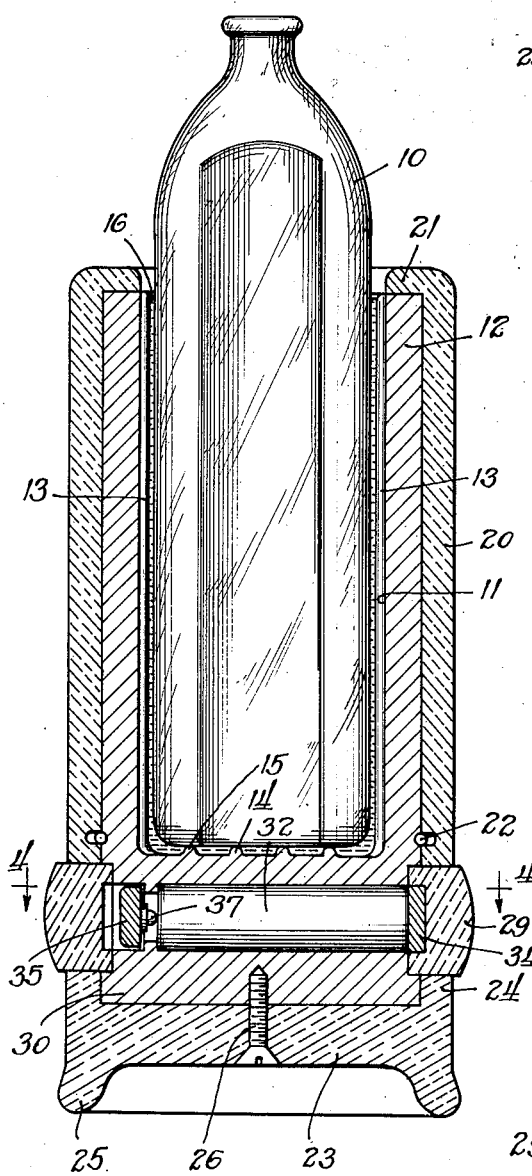
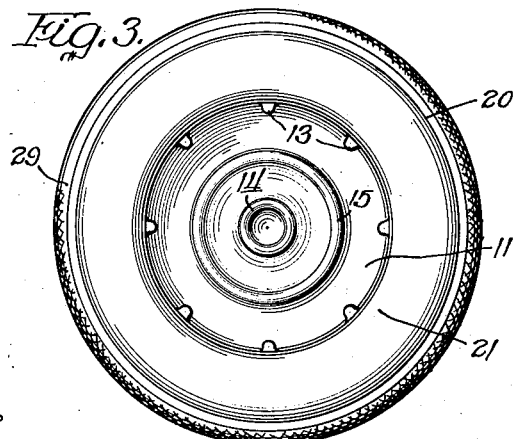
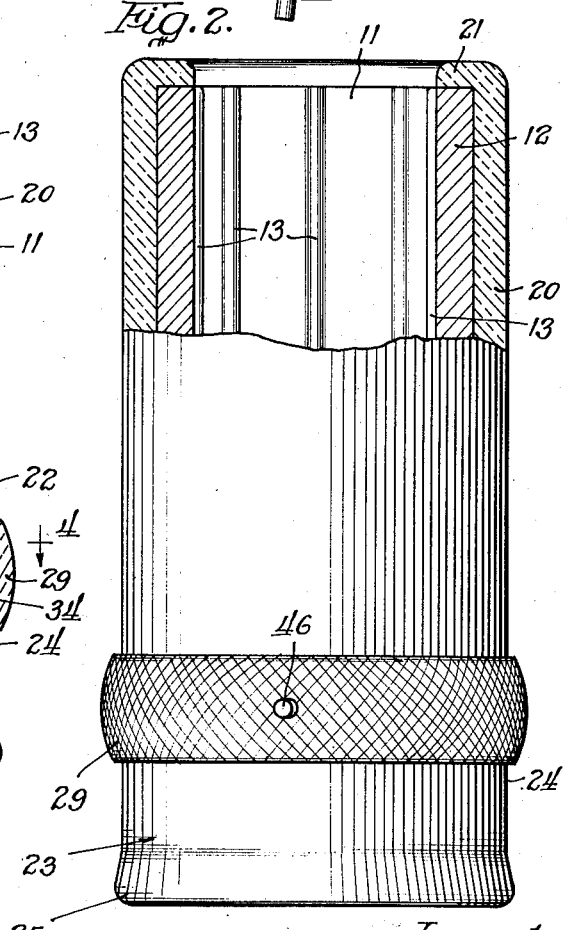
Inventor:
Manly S. Mumford
By Brown, Jackson, Boettcher & Dienner
Attys.

June 20, 1950 M. S. MUMFORD 2,512,284
PORTABLE UNIT FOR HEATING MILK BOTTLES AND THE LIKE
Filed Oct. 30, 1946 2 Sheets-Sheet 2

Inventor:
Manly S. Mumford.
By Brown, Jackson, Boettcher & Dienner
Attys.

Patented June 20, 1950

2,512,284

UNITED STATES PATENT OFFICE 2,512,284

POETABLE UNIT FOR HEATING MILK BOTTLES AND THE LIKE

Manly S. Mumford, Evanston, Ill.

Application October 30, 1946, Serial No. 706,769

5 Claims. (Cl. 126—261)

My invention relates, generally, to self-contained heating devices, and it has particular relation to such devices in which chemical heating means is employed to generate heat.

There are many instances where small amounts of heat are required and where it is impractical to employ conventional means for producing the same. A particular example is in the heating of small quantities of liquid, such as milk or water, for an infant while traveling away from home or where the usual conveniences are not readily available. It often creates quite a problem to heat milk or water while traveling in an automobile, railway car, or airplane. The present invention provides a simple, efficient, and satisfactory solution to the problem.

Among the objects of my invention are: To provide for safely and efficiently generating sufficient heat to raise the temperature of a bottle of milk or the like to the desired point without employing a flame or an external source of heat; to employ a replaceable detonable chemical cartridge for generating the heat; to mount the cartridge so that it is not expelled when it is detonated; and to detonate the cartridge by the snap action of a detonating lever on rotation of a closure ring surrounding the mechanism.

Other objects of my invention will, in part, be obvious and in part appear hereinafter.

My invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description, taken together with the accompanying drawings, in which:

Figure 1 is a longitudinal cross-sectional view of my improved form of heating means;

Figure 2 is a view, in side elevation, of the heating means shown in Figure 1, the upper portion being broken away in order to show certain details of construction;

Figure 3 is a top plan view of the device as illustrated in Figure 2;

Figure 4:
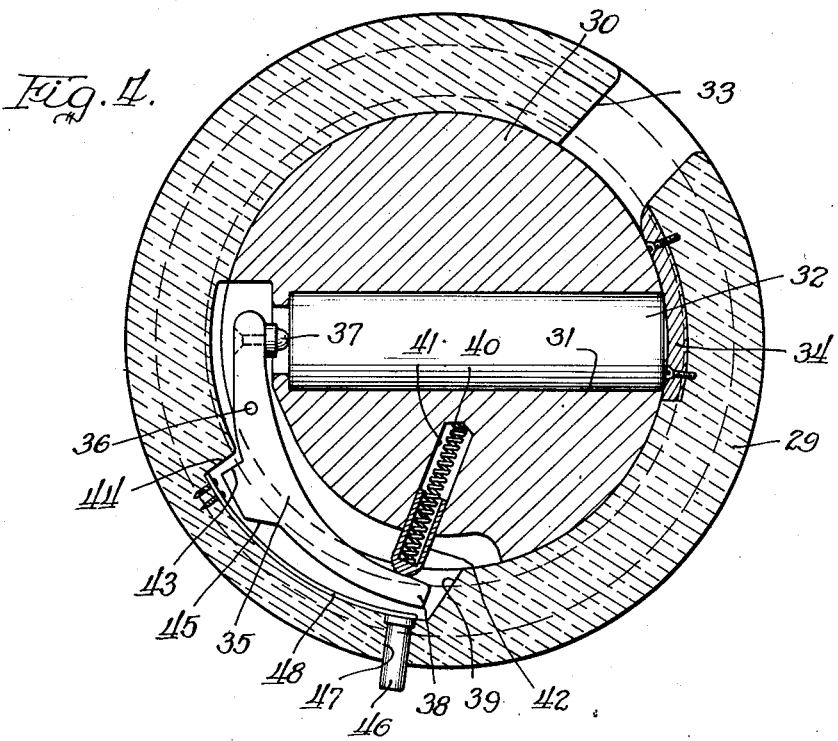
Figure 4 is a detail sectional view taken along the line 4—4 of Figure 1.

Referring now particularly to the drawings, it will be observed that the reference character 10 designates an irregularly shaped body, such as a milk bottle for an infant. As pointed out above, it is often desirable to heat a bottle of liquid, such as milk or water, for an infant while traveling where it is particularly inconvenient to employ the conventional sources of heat for accomplishing the same. In accordance with my invention, I provide for placing the body or bottle 10 in an opening 11 formed in a receptacle 12 that is made of high heat conductivity material as aluminum, copper, etc. The interior of the receptacle 12 may be provided with ribs 13 extending longitudinally thereof and at the bottom there are integrally formed concentric rings 14 and 15 to provide limited area contact with the bottom of the body or bottle 10. If desired, a limited amount of liquid, such as water and indicated at 16, may be employed in the receptacle 12 to provide intimate contact with the irregularly shaped body 10 and to limit, by its vaporization temperature, the temperature to which the body 10 can be heated.

Since the receptacle 12 is raised to a relatively high temperature, it is desirable that it be encased in suitable insulating means. Accordingly, I have provided a heat insulating covering on the outside of the receptacle 12. This covering is in two parts. The upper part 20 surrounds the major portion of the receptacle 12, as illustrated in Figures 1 and 2, and has an inwardly extending radial lip or flange 21 which extends over the upper end of the receptacle 12. The upper part 20 of the heat insulating covering may be held in place on the receptacle 12 by a snap ring 22.

The lower end of the receptacle 12 is surrounded by a lower part 23 of the heat insulating covering which has an upwardly extending rim 24 that surrounds the lower end of the receptacle 12. It also has a depending foot portion 25 which forms a stand for the device. The part 23 of the heat insulating covering may be secured to the receptacle 12 by any suitable means, such as by a screw 26.

The heat insulating covering comprises the upper and lower parts 20 and 23 and may be formed of any suitable insulating material. For example, it may be formed of porcelain or it may be formed of plastic, such as Bakelite.

Between the upper and lower parts 20 and 23 of the heat insulating covering is a closure ring 29 that may be formed of suitable insulating material, such as hard rubber. As illustrated more clearly in Figures 1 and 4 of the drawings, the closure ring 29 surrounds the lower portion or bottom 30 of the receptacle 12 which has a transversely extending opening 31 therein for receiving a replaceable heat generating cartridge 32. The cartridge 32 is of conventional construction and per se forms no part of the present invention. A cartridge, such as that placed on the market by the Mine Safety Appliances Company of Pittsburgh, Pennsylvania, may be employed in practicing the present invention. This cartridge includes percussion means which, when detonated, initiates a chemical reaction that proceeds with the evolution of a relatively great amount of heat at a relatively rapid rate. This heat is transferred to the lower portion 30 of the receptacle 12 and, since it is formed of good heat-conducting material, this heat is distributed quickly over the inner surface of the receptacle 12 and is available for heating the liquid in the body 10. The heat insulating covering, comprising the upper and lower parts 20 and 23 and the closure ring 29, serves to reduce the loss of heat from the outer surface of the receptacle 12 and to confine it within the receptacle 12 where it is most useful.

Figure 5:
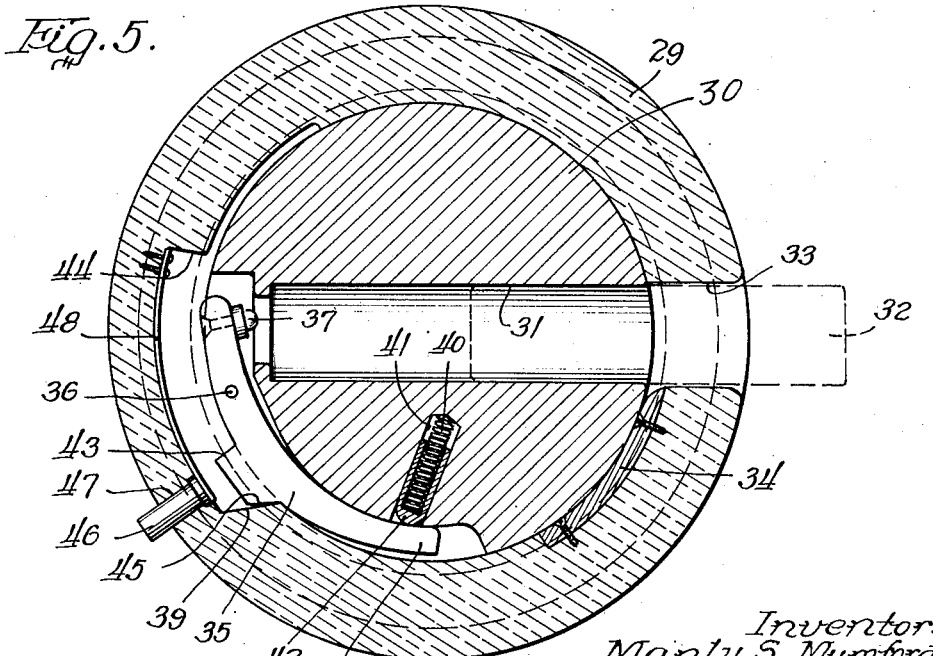
Figure 5 is a view, similar to Figure 4 but showing the position of the closure ring for receiving the replaceable cartridge.

Referring to Figures 4 and 5, it will be observed that the closure ring 29 has an opening 33 which can be moved into registry with the opening 31 in the bottom 30 of the receptacle 12. When thus positioned, the cartridge 32 can be inserted into the opening 31. Thereafter the closure ring 29 can be rotated in a counterclockwise direction, as viewed in Figure 5, to the position shown in Figure 4. In this position, the closure ring 29 is effective to prevent the cartridge 32 from being expelled when it is detonated. A wear plate 34 of metal may be provided along the inner surface of the closure ring 29 for abutting against the adjacent end of the cartridge 32 to take up the impact of the shock incident to its being detonated.

The cartridge 32 may be detonated by a lever 35 which is pivoted at 36 on the bottom 30 of the receptacle 12. At its upper end the lever 35 carries a pin 37 which is arranged to strike the percussion cap of the cartridge 32 for setting it off. The lower or tail end 38 of the lever 35 is arranged to ride over a shoulder 39 of the closure ring 29 with a snap action as impelled by a compression spring 40. It will be observed that the spring 40 is located in a suitable aperture 41 in the bottom 30 and reacts against a thimble 32 which, in turn, bears against the underside of the tail 38.

The movement of the closure ring 29 in the counterclockwise direction is limited by a shoulder 43 on the lever 35. When the shoulder 43 engages the shoulder 44 on the closure ring 29, no further counterclockwise movement is permitted. The movement of the closure ring 29 in the opposite direction is limited by the shoulder 45 on the lever 35 when it engages the shoulder 39.

In order to move the tail 38 of the lever 35 out of the path of the shoulder 39 to permit the closure ring 29 to be returned to the position shown in Figure 5, a release pin 46 is employed. The release pin 46 extends through a suitable radial aperture 47 in the closure ring 29 and is carried by a leaf spring 48 at one end, the other end of which is secured, as indicated, to the closure ring 29.

In operation, with the closure ring 29 positioned as shown in Figure 5 of the drawings, the cartridge 32 is inserted in the opening 31 that is located in the bottom 30. The closure ring 29 then is rotated in a counterclockwise direction to the position shown in Figure 4. When the shoulder 39 is moved out of engagement with the tail 38 of the lever 35, the spring 40 moves the lever 35 with a snap action, thereby causing the pin 37 to detonate the cartridge 32. The intended chemical reaction takes place and heat is generated which is distributed by the receptacle 12. The body 10, containing milk or water or the like, is inserted in the opening 11 in the receptacle 12. If available, the liquid 16, such as water, may be poured around the body 10 to provide intimate contact with the body and to limit the temperature to which it can be raised. Of course, the liquid 16 can be poured into the receptacle 12 before the body 10 is inserted. If the occasion warrants, the liquid 16 may be omitted. After the heat from the cartridge 32 has been dissipated and it is desired to remove the same, the closure ring 29 is rotated in a clockwise direction to its original position. At the same time, the release pin 46 is depressed to move the tail 38 of the lever 35 out of the path of the shoulder 39. When the shoulder 45 of the lever 35 engages the shoulder 39, as shown in Figure 5, the opening 33 is in registry with the opening 31 and no further movement of the closure ring 29 is permitted.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

I claim as my invention:

1. Means for heating a body of material comprising, in combination, a high heat conductivity member having one opening for receiving said body and another opening for receiving a heat generating replaceable cartridge, a heat insulating covering for said member including a closure ring having an opening for registry with said other opening therein to permit insertion of the cartridge and being movable thereafter to close said other opening for preventing the cartridge from being expelled when it is detonated, and means for detonating the cartridge.

2. The invention, as set forth in claim 1, wherein the insulating covering is in two parts and the closure ring is located therebetween.

3. The invention, as set forth in claim 1, wherein the detonating means is operated by the closure ring when it is moved to the closed position.

4. The invention, as set forth in claim 1, wherein the detonating means comprises a lever pivoted on the high heat conductivity member and a spring, and the closure ring holds said lever in retracted position until a shoulder thereof is moved out of engagement with said lever whereupon said lever is released and moves with a snap action under the influence of said spring to detonate the cartridge.

5. The invention, as set forth in claim 1, wherein the detonating means comprises a lever pivoted on the high heat conductivity member and a spring, the closure ring holds said lever in retracted position until a shoulder thereof is moved out of engagement with said lever whereupon said lever is released and moves with a snap action under the influence of said spring to detonate the cartridge, and a release pin extends through said closure ring and is operable to move said lever out of the path of said shoulder to permit return movement of said closure ring.

MANLY S. MUMFORD.

REFERENCES CITED

The following references are of record in the file of this patent:

UNITED STATES PATENTS

| Number | Name | Date |
|---|---|---|
| 896,719 | Gerbrecht et al. | Aug. 25, 1908 |
| 1,178,325 | Lang | Apr. 4, 1916 |
| 1,417,075 | La Cour et al. | May 23, 1922 |
| 1,573,872 | Schwartz | Feb. 23, 1926 |
| 1,622,494 | Cranston | Mar. 29, 1927 |
| 1,828,628 | Torgerson | Oct. 20, 1931 |
| 2,020,292 | Eggert et al. | Nov. 12, 1935 |
| 2,220,777 | Othmer | Nov. 5, 1940 |
| 2,384,278 | Caldwell | Sept. 4, 1945 |

FOREIGN PATENTS

| Number | Country | Date |
|---|---|---|
| 24,009 | Great Britain | of 1914 |
| 75,176 | Switzerland | June 16, 1917 |